UNITED STATES PATENT OFFICE.

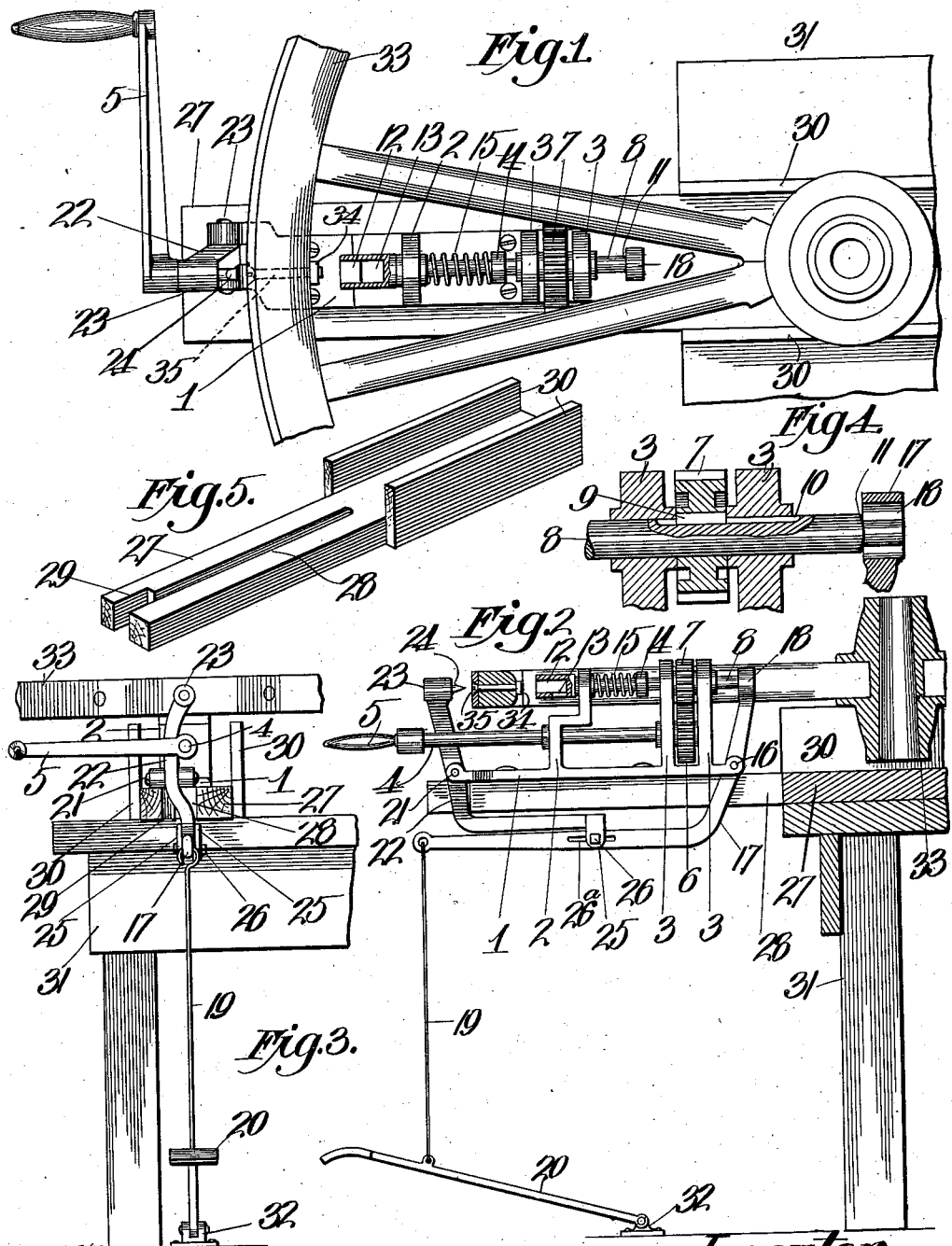

MILES K. BARRON, OF COFFEYVILLE, KANSAS.

WHEEL-TIRE BOLTER.

1,028,662.  Specification of Letters Patent.  Patented June 4, 1912.

Application filed September 14, 1910. Serial No. 582,069.

*To all whom it may concern:*

Be it known that I, MILES K. BARRON, a citizen of the United States, residing at Coffeyville, in the county of Montgomery and State of Kansas, have invented certain new and useful Improvements in Wheel-Tire Bolters, of which the following is a specification.

This invention relates to wheel tire bolters and has for its object the provision of a device of this character which can be operated and controlled by a single person and which embodies the desirable features of simplicity, strength, durability and cheapness of construction.

With this general object in view the invention consists in certain novel and peculiar features of construction and organization as hereinafter described and claimed;
and in order that it may be fully understood reference is to be had to the accompanying drawing, in which—

Figure 1, is a plan view of a wheel tire bolter embodying my invention, arranged in operative relation to a fragment of a wheel. Fig. 2, is a view showing the device in side elevation and the mount or support therefor, and the wheel in vertical section. Fig. 3, is a front view. Fig. 4, is an enlarged vertical section of a part of the device. Fig. 5, is a detail perspective view of the mount for the device.

Referring now to the drawing in detail, 1 indicates a base plate equipped with upwardly projecting bearing arms 2 and 3, and journaled in said arms is a shaft 4, having a handle 5, by which it may be turned. Secured on the shaft between the bearing arms 3 is a cog wheel 6, meshing with a similar wheel 7 arranged to slide upon and rotate with a shaft 8 journaled in said bearings arms, the wheel 7 having a key 9 fitting slidingly in the longitudinal groove 10, in shaft 8. The rear end of shaft 8 is diametrically reduced to form a rearwardly-disposed shoulder 11, and forward of bearing 2 the said shaft terminates in a hollow head 12 of rectangular form in cross section and provided with an opening 13, for a purpose which hereinafter appears, and secured on said shaft is a collar 14 to receive the pressure of a coiled spring 15 mounted on the shaft and bearing at its front end against arm 2, and at its rear end against said collar, said spring when unopposed holding the shaft 8 at its rearmost limit of movement.

Pivoted at 16 to the rear end of base plate 1, for movement in a vertical plane, is an angle lever 17 provided with a vertical slot 18 in its rear end, said slot being just wide enough to freely receive the reduced end of shaft 8, so that the shoulder 11 of said shaft shall under the pressure of spring 15, bear against the rear end of the lever 17, and hold its front end yieldingly elevated. Pivoted to the front end of the lever 17 is a pull rod 19 pivoted at its lower end to a treadle or foot lever 20.

Pivoted at 21 to the front end of the baseplate is an angle lever 22 which terminates at its upper end in a head 23 equipped with a screw driver point 24 in line with the axis of shaft 8, the said lever being bowed laterally as shown in Fig. 3, to avoid conflict with shaft 4, and to dispose its lower end vertically above the lower arm of lever 17. At its lower end the lever 22 is provided with a pair of depending ears 25 fitting snugly at opposite sides of lever 17, a bolt 26 carried by said ears extending slidingly through a longitudinal slot 26ª in lever 17.

As a convenient and practical mount for the device I preferably employ a bar 27 such as a 2x4 and provide the same with a longitudinal slot 28, through which the levers 17 and 22 depend, the slot being widened at one side at 29 for the special accommodation of the bent portion of lever 22, as shown more particularly in Fig. 3. At the rear end of the slot the bar is provided with upwardly projecting walls 30, and equipped end of the bar rests upon and is adapted to be secured in any suitable manner to a suitable support, such as a worktable 31. When the parts are thus arranged the treadle or foot lever 20 is pivotally connected as at 32 to the floor.

When ready to bolt a tire upon a wheel 33, the latter is arranged horizontally with the hub flange resting upon the walls 30 and the lower portion of the hub depending between said walls, the standards 2 and 3 and the parts carried thereby being disposed between adjacent spokes and the felly and tire in the horizontal plane of and between the hollow head 12 of shaft 8 and the upper end of the lever 22. The operator then places his foot upon and depresses the treadle and thereby operates said levers 17 and 22, the former sliding shaft 8 forward against the resistance of spring 15 until the hollow head fits snugly upon the nut 34 and the screw driver point engages the nick in the head of the bolt 35 upon which said nut is mounted. He then while holding the parts in this position, grasps and turns handle 5 and thus through the gearing described, imparts rotation to the shaft 8 and causes the head thereof to screw the nut firmly home upon the bolt and thus secure the tire tightly to the felly. The handle is then released and the pressure removed from the foot lever to permit spring 15 to return the levers to their original positions. The wheel is then lifted and turned until another bolt and nut is brought into the vertical plane of shaft 8 and then the wheel is lowered to dispose said bolt and nut in line with the screw driver point and said shaft 8, when the manipulation described is repeated to secure said bolt firmly in place, the actions described being repeated until all of the nuts are screwed tightly upon their respective bolts, it being noticed in this connection that the tire can be removed by reversing the operations described and that the nuts will successively fall through the opening 13 in the side of the head 12 of shaft 8 so that the operator does not have to remove them by hand from the hollow head.

From the above description it will be apparent that I have produced a wheel tire bolter possessing the features of advantage enumerated as desirable and I wish it to be understood that I reserve the right to make all changes in the form, proportion, detail construction and arrangement of the parts properly falling within the spirit and scope of the appended claims.

I claim:

1. A wheel tire bolter, comprising a base plate provided with a plurality of upwardly projecting bearing arms, a slidable shaft journaled in said arms and provided at its front end with a wrench head, a spring for exerting pressure in opposite directions on one of said bearing arms and the shaft to hold the latter yieldingly at one end of its slidable movement, a lever pivoted to said base plate provided with a head for engaging and holding a rotatable object against turning movement, said head being disposed in axial alinement with and forward of said shaft, a lever engaging the rear end of said shaft for forcing the same forward, said levers having a pin and slot connection below the base plate, means connected to one of the levers for imparting movement to both, and means for imparting rotation to said shaft.

2. A wheel tire bolter, comprising a base plate having a plurality of upwardly projecting arms, a shaft journaled and slidable endwise in said arms and of reduced diameter at its rear extremity to form a rearwardly disposed annular shoulder, and provided at its front extremity with a hollow head of angular form internally in cross section and provided in the bottom wall of said head with an opening, a spring exerting pressure in opposite directions upon one of said arms and said shaft to hold the latter yieldingly at its rearmost position of sliding adjustment, an angle lever arranged to operate in a vertical plane and pivoted to the rear end of the base plate and provided at its upper end with an upright slot receiving the reduced end of the shaft with the shoulder of the latter engaging the slotted end of the lever at opposite sides of the slot, a second angle lever pivoted to the front end of the base plate for movement in a vertical plane and provided at its upper end with a head alined with and forward of said shaft and adapted to engage and hold a rotatable object from turning and having a pin and slot connection at its opposite end with the first-named angle lever, a foot treadle connected to the said first-named lever, and means for rotating the said shaft.

3. The combination with a suitable support of a bar mounted thereon and projecting forwardly therefrom and provided in its projecting edge with a longitudinal slot and provided rearward of said slot with upwardly projecting walls as a support for a horizontally arranged wheel, a base plate mounted on the bar with arms projecting upward between adjacent spokes of the said wheel, a longitudinally slidable shaft journaled in said arms extending radially of the wheel between said adjacent spokes and provided forward of the foremost bearing with a hollow head susceptible of non-rotatably receiving a nut at the inner side of the felly of the wheel, yielding means for holding said shaft with its hollow head rearward of said nut, a cog wheel mounted slidingly and non-rotatably on said shaft between a pair of said bearing arms, a lever pivoted to the base plate and susceptible of sliding said shaft forwardly until its head receives said nut, a second lever pivoted to said base plate and provided with a rearwardly projecting screw-driver point for engagement with the nick of the head of the bolt carrying said nut, a pin and slot connection between the opposite end of the lever and the first-named lever forward of the pivotal point of the latter, means for operating said levers, a second shaft journaled in said bearing arms and provided at its front end with a handle, and a cog wheel secured upon said shaft between a pair of said bearing arms and engaging the first-named cog wheel.

In testimony whereof I affix my signature, in the presence of two witnesses.

MILES K. BARRON.

Witnesses:
E. H. PEARCE,
L. E. HOOD.

Copies of this patent may be obtained for five cents each, by addressing the "Commissioner of Patents, Washington, D. C."